United States Patent
Detwiler et al.

(10) Patent No.: US 10,749,623 B2
(45) Date of Patent: Aug. 18, 2020

(54) FAULT-TOLERANT DISTRIBUTED PASSIVE OPTICAL NETWORK BONDING

(71) Applicant: ADTRAN, Inc., Huntsville, AL (US)

(72) Inventors: Thomas Detwiler, Huntsville, AL (US); Richard Lee Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/228,848

(22) Filed: Dec. 21, 2018

(65) Prior Publication Data
US 2020/0204285 A1    Jun. 25, 2020

(51) Int. Cl.
*H04J 14/02*    (2006.01)
*H04Q 11/00*    (2006.01)

(52) U.S. Cl.
CPC ...... *H04J 14/0245* (2013.01); *H04J 14/0256* (2013.01); *H04Q 11/0067* (2013.01)

(58) Field of Classification Search
CPC .......................................... H04J 14/0242–0252
See application file for complete search history.

(56) References Cited

U.S. PATENT DOCUMENTS

| | | | | |
|---|---|---|---|---|
| 2009/0263122 A1* | 10/2009 | Helkey | ............... | H04B 10/032 398/7 |
| 2017/0012731 A1* | 1/2017 | Luo | ......................... | H04L 69/22 |
| 2017/0070295 A1* | 3/2017 | Remein | .................. | H04B 10/50 |
| 2017/0317779 A1* | 11/2017 | Wu | ..................... | H04J 14/0232 |

* cited by examiner

*Primary Examiner* — Shi K Li
(74) *Attorney, Agent, or Firm* — Fish & Richardson P.C.

(57) ABSTRACT

Methods, systems, and apparatus for hosting an optical line terminal (OLT) bonding engine are disclosed. In one aspect, packet data for transmission over a passive optical (PON) is selected. A transmission wavelength assigned to the packet data is identified. A particular OLT is selected from among the additional OLTs to transmit the packet data over the PON based on the corresponding wavelength of the particular OLT matching the identified transmission wavelength assigned to the packet. The packet data is formatted based on the particular OLT. The formatted packet data is transmitted to the particular OLT for transmission over the communications interface.

18 Claims, 3 Drawing Sheets

FAULT-TOLERANT DISTRIBUTED PASSIVE OPTICAL NETWORK BONDING

BACKGROUND

This specification relates to Passive Optical Network (PON) wavelength bonding.

In a PON, data rates are increasing to 10 Gbps per wavelength, and 25 Gbps per wavelength in the near future. However, demand for peak data rates may exceed the per-wavelength rate of installed equipment, such that multiple wavelengths may be used to increase capacity between an Optical Line Terminal (OLT) and an Optical Network Unit (ONU). For example, Next Generation Passive Optical Network (NG-PON2) with FEC enabled specifies an 8.67 Gbps peak rate per downstream/upstream wavelength, and using two wavelengths would increase the peak rate to 17.34 Gbps per downstream/up stream.

SUMMARY

Passive Optical Network (PON) wavelength bonding can be used to improve bandwidth available to individual packet flow over the PON and/or reduce latency associated with packet data transmission. For example, PON wavelength bonding can enable generalized bandwidth aggregation within wavelength division multiplexing (TWDM) systems that is otherwise not achievable through other wavelength aggregation methods, such as Ethernet link aggregation (LAG) or equal-cost multipath for layer-3 flows (ECMP). This can be accomplished by using multiple channel terminations (CTs) as a single, wider data path (similar to 40GE or 200GE). However, the complexity of the bonding function is sufficiently high to often require a hardware-level implementation, and high bandwidth/low latency interfaces to the CTs (i.e. EPON media access controllers (MACs) or NG-PON2 transmission convergence (TC) layer). Although bonding engine logic can be co-located on subsidiary CTs, a disadvantage to this technique is that all wavelengths of a single PON would depend on the same hardware, connecting subscribers to a single point of failure.

In TWDM-PON systems, a PON is defined as the set of wavelength pairs associated with a common optical distribution network, each wavelength pair or channel consisting of an upstream and downstream wavelength, each channel terminated in an individual CT (channel termination) in an OLT. The set of all OLTs connected to a set of PONs is known as a PON system. Each PON has a set of ONUs, each of which can be configured to communicate on any channel in the PON. It is often desirable to distribute the set of CTs associated with a PON to different OLTs to enable redundancy and eliminate single-points-of-failure. This introduces a problem in bonded PON systems, because the bonding engine associated with a bonded PON must communicate with all of the OLTs associated with the bonded PON. One solution to this problem is to concentrate all of the bonding engines in a single hardware module. However, this architecture presents two problems. First, the bonding engine hardware module itself is a single point of failure for traffic across all the wavelengths, which is further compounded if transceivers (or CTs) for all bonded wavelengths are co-located on the same hardware module with the bonding engine. Second, if transceivers are not co-located with the bonding engine, the system grows in complexity (e.g. interfaces are required for carrying data between the bonding engine and the distant transceivers, in addition to network uplink interfaces).

In general, one innovative aspect of the subject matter described in this specification can be embodied in techniques to distribute the bonding engines to multiple OLTs, which eliminates the likelihood of the bonding engine being a single point of failure for traffic across all the wavelengths. The bonding engine is located on one of multiple OLTs of a networked system of OLTs and manages transmission of packets destined for a particular PON (made up of multiple wavelengths). Each OLT typically supports multiple transceivers (or CTs) for attaching to multiple PONs, with one or more transceivers (CTs) connected to each PON. Each PON that comprises transceivers from a collection of multiple OLTs requires a unique instance of bonding engine (i.e. one bonding engine per PON). The bonding engine is configured to serve as the TC layer or MAC layer for all wavelengths on a PON, controlling the distribution of packet data and dynamic bandwidth allocation (DBA) grants across available wavelengths, and then transmit each wavelength's portion to the appropriate OLT that hosts that wavelength's CT on that PON. In the upstream direction, after burst-mode data is received at the CT cards, the bonding engine collects the bursts from the different OLTs that host the CTs. The bonding engine function for multiple physical PONs can be distributed across different OLTs, which enables the provisioning of redundant bonding engines to maintain available capacity if one of the bonding engines experiences a failure. In some implementations, the bonding engine can be configured with systems that use other wavelength aggregation techniques, such as flow-based aggregation of multiple wavelengths (e.g. LAG or ECMP), where a distribution point is hosted in an OLT instead of the top of rack (ToR) architecture, or an aggregation switch that connects the OLT to an access network. In this way, the bonding engine supports common alternative aggregation methods while maintaining the same level of redundancy across a set of OLT hardware modules.

An example of a system includes multiple optical line terminals (OLTs) and a communications interface that couples the additional OLTs to multiple optical network units (ONUs). The multiple OLTs includes a first OLT that hosts a bonding engine and additional OLTs that are connected to the first OLT. Each OLT included in the additional OLTs includes a transceiver. Each transceiver is configured to transmit packets over a passive optical network (PON) on a corresponding wavelength that differs from wavelengths used by other OLTs among the additional OLTs. The first OLT includes one or more processors that cause the bonding engine to perform operations. The operations include selecting packet data for transmission over the PON, and identifying a transmission wavelength assigned to the packet data. The operations also include identifying, from among the additional OLTs, a particular OLT to transmit the packet data over the PON based on the corresponding wavelength of the particular OLT matching the identified transmission wavelength assigned to the packet. The operations further include formatting the packet data based on the particular OLT, and transmitting the formatted packet data to the particular OLT for transmission over the communications interface.

These and other implementations can each, optionally, include one or more of the following features. For example, in some implementations, the multiple ONUs include a first ONU that is incapable of bonding across multiple wavelengths and carries data of an unbonded XGEM in a physical port of the first OLT and a second ONU that is capable of bonding across multiple wavelengths and carries data of one or more bonded XGEMs (bXGEMs) in two or more physical ports of a second OLT of the additional OLTs.

In some implementations, the packet data includes a first set of packets to be transmitted to the first ONU and a second set of packets to be transmitted to the second ONU.

In some implementations, formatting the packet data includes formatting the first set of packets. Additionally, transmitting the formatted packet data to the particular OLT for transmission over the communications interface includes transmitting the first set of formatted packets to the particular OLT for transmission to the first ONU over the communications interface.

In some implementations, formatting the first set of packets based on the particular OLT includes encapsulating the first set of packets based on the unbonded XGEM in two or more physical ports of the particular OLT.

In some implementations, the one or more processors cause the bonding engine to perform operations that further include identifying, from among the additional OLTs, the second OLT to transmit the second set of packets over the PON based on the corresponding wavelength of the second OLT matching a transmission wavelength assigned to the second set of packets. The additional operations include formatting the packet data includes formatting the second set of packets based on the particular OLT. Additionally, transmitting the formatted packet data to the particular OLT for transmission over the communications interface includes transmitting the second set of formatted packets to the second OLT for transmission to the second ONU over the communications interface.

In some implementations, formatting the second set of packets based on the particular OLT includes encapsulating the second set of packets based on the one or more bXGEMs in two or more physical ports of the second OLT.

In some implementations, the additional OLTs include a second OLT that hosts a second bonding engine, and a third OLT that hosts a third bonding engine. Additionally, the second bonding engine terminates a second PON and the third bonding engine terminates a third PON.

In some implementations, the bonding engine operates as a link aggregation group (LAG) distribution processor that is configured to communicate with the multiple ONUs through unbonded XGEMs across multiple wavelengths.

In some implementations, the one or more processors cause the bonding engine to perform operations that further include performing joint dynamic bandwidth allocation across a first traffic load for the unbonded XGEM or LLID in a physical port of the particular OLT and a second traffic load for the one or more bXGEMs or bonded LLIDs in two or more physical ports of the second OLT. The operations also include generating a first bandwidth map for the first traffic load based on performing the joint dynamic bandwidth allocation across the first traffic load and the second traffic load and generating a second bandwidth map for the second traffic load based on performing the joint dynamic bandwidth allocation across the first traffic load and the second traffic load. The operations further include transmitting the first bandwidth map to the particular OLT and transmitting the second bandwidth map to the second OLT.

In some implementations, the additional OLTs include a second OLT that is configured to perform forward error correction (FEC) that encodes and decodes data for the physical port of the first OLT.

In some implementations, the second OLT is configured to perform operations that include encoding downstream data from the first OLT and transmitting the encoded downstream data to the multiple ONUs.

In some implementations, the second OLT is configured to perform operations that include decoding upstream data from the multiple ONUs, and transmitting the decoded traffic load to the first OLT.

In some implementations, the one or more processors cause the bonding engine to perform operations that further include identifying a timebase of the first OLT, identifying a respective timebase of each of the additional OLTs, and synchronizing the timebases of the additional OLTs based on the timebase of the first OLT.

In some implementations, formatting the packet data includes identifying timestamp information for packets to be transmitted over the PON. The formatting also includes inserting, for each of the packets to be transmitted over the PON, corresponding timestamp information in a header of the packet.

In some implementations, the first OLT and one or more of the additional OLTs are configured to perform TC-layer bonding for packets to be transmitted over the PON.

In some implementations, the additional OLTs includes a subset of additional OLTs that each host a failover bonding engine. Additionally, an OLT included in the subset of additional OLTs includes one or more processors that cause the failover bonding engine to perform operations. The operations include determining that the bonding engine hosted on the first OLT is not operational, and based on determining that the bonding engine hosted on the first OLT is not operational, distributing the operations to be performed by the bonding engine hosted on the first OLT to the failover bonding engines hosted on the OLTs included in the subset of additional OLTs.

The methods, devices, and/or systems described in the present disclosure can realize one or more advantages over conventional systems. The methods, devices and systems can synchronize and time equalize bit streams of a packet flow, for example, between a set of OLTs operating on a number of PONs, and between that set of OLTs and all attached ONUs on the PONs, on multiple wavelengths. Different portions (e.g., fixed size segments) of a given packet in the packet flow are distributed on the multiple wavelengths at one end of a communications path (e.g., at the OLT) on-demand at real-time basis, and combined at the other end of the communications path (e.g., the ONU). In doing so, latency for transmitting the packet is reduced, since the packet is transmitted on multiple wavelengths simultaneously and each wavelength only carries a portion of the packet instead of the whole packet. In addition, demand for peak data rate of a packet flow exceeding a data rate of a single wavelength can be supported. For example, with two wavelengths (e.g., each wavelength having an 8.67 Gbps peak data rate) carrying a packet comprising multiple words (e.g., 64-bit words) between an OLT and an ONU, the odd words of the packet can be sent on one wavelength and the even words of the packet can be sent on the other wavelength. As a result, the effective peak data rate between the OLT and the ONU is doubled (e.g., 17.34 Gbps). Additional wavelengths may be added, extending to 3, 4, or any number of active enabled wavelengths. Furthermore, the bonding engine enables an OLT to dynamically balance loads according to offered non-bonded load (e.g., traffic carried by a single wavelength) and bonded load (e.g., traffic carried by multiple wavelengths in a bonding group), since bonded loads are distributed on available wavelengths in a bonding group on-demand, at real-time basis.

While some aspects of this disclosure refer to computer-implemented software embodied on tangible media that processes and transforms data, some or all of the aspects may be computer-implemented methods or further included in respective systems or devices for performing the described functionality. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This document describes methods, systems, and apparatus for improving bandwidth available to individual packet flow on a Passive Optical Network (PON) by bonding multiple links (e.g., wavelengths). For example, a telecommunications device (e.g., an Optical Line Terminal (OLT)) can host a bonding engine and determine, in advance of transmitting a bonded packet, when each wavelength in a bonding group will be available for transmitting the bonded packet (e.g., when current transmission of a packet over a given wavelength will be completed). In addition, the telecommunications device can predetermine how many bytes of the bonded packet are to be sent on each bonded wavelength, so that transmissions of various portions of the bonded packet on the bonded wavelengths end at the same time or substantially simultaneously. Although this disclosure refers to passive optical telecommunications systems for purposes of example, the subject matter of this document can be applied to other types of telecommunications systems or other systems that offer multiple wavelengths for data transmission.

A Passive Optical Network (PON), such as a Next-Generation Passive Optical Network 2 (NG-PON2) or a 10 Gbps Ethernet Passive Optical Network (10G-EPON), can provide 10 Gbps data rate per wavelength (not accounting for various overhead). For example, an OLT with multiple optical transceivers (e.g., multiple ports operating at different wavelengths) can transmit an 8.67 Gbps peak data rate to an ONU on one wavelength and receive an 8.67 Gbps peak data rate from the ONU on another wavelength. In some cases, the ONU may have multiple optical transceivers (i.e., a bonding-capable ONU with multiple tunable lasers) so that the ONU can receive data from the OLT on multiple wavelengths downstream and transmit data to the OLT on multiple wavelengths upstream.

As described throughout, "XGEM" refers to a NG-PON2 encapsulation method. For example, XGEM can be a data frame transport scheme that can be used in PON systems that are connection-oriented and that support fragmentation of user data frames into variable sized transmission fragments. The XGEM is used as a wrapper for Ethernet frames to be sent over a PON.

As described throughout, "bonded XGEM" (bXGEM) refers to new and/or adjusted form of XGEM, that allow for the coexistence of bonded and non-bonded equipment and flows on a matrix of active wavelengths on a PON using the bonding techniques described in detail below. The bXGEM can use the same attributes as an unbonded XGEM and can additionally use bonded attributes for encapsulating bonded transmissions.

As described throughout, "LLID" refers to an EPON logical link identifier (or one of its subordinate classes, e.g. PLID, MLID, or ULID for physical, management, and user LLID), which provides an analogous method to XGEM-ID for identifying the service flow and subscriber to which a packet flow belongs. A bonded form of LLID to use across multiple operating wavelengths is considered a natural application of this method, pertinent to EPON networks.

For a bonding-capable ONU, the OLT can bond multiple wavelengths to transmit data to the ONU downstream and the ONU can bond multiple wavelengths to transmit data to the OLT upstream. Wavelength bonding can be accomplished using similar techniques disclosed in U.S. Pat. No. 9,924,248 and U.S. Pat. App. Pub. No. 2017-0223438. Not all ONUs in a PON are required to participate in wavelength bonding. For example, there can be bonding-capable ONUs and non-bonding ONUs in the same PON. In addition, not all active wavelengths in a PON are required to carry bonded traffic. For example, there can be some wavelengths available to carry bonded traffic while other wavelengths carry only non-bonded traffic. The service and/or traffic flows can be aware of the wavelength bonding (e.g., which ONU is a bonding-capable ONU, which wavelength can carry bonded traffic). Wavelengths bonding can be achieved independently in the upstream and downstream directions, and can span a variable number of wavelengths. Any telecommunications systems with multiple wavelengths or multiple physical links connecting one device or element to another may benefit from the subject matter described in this document.

Figure 1A:
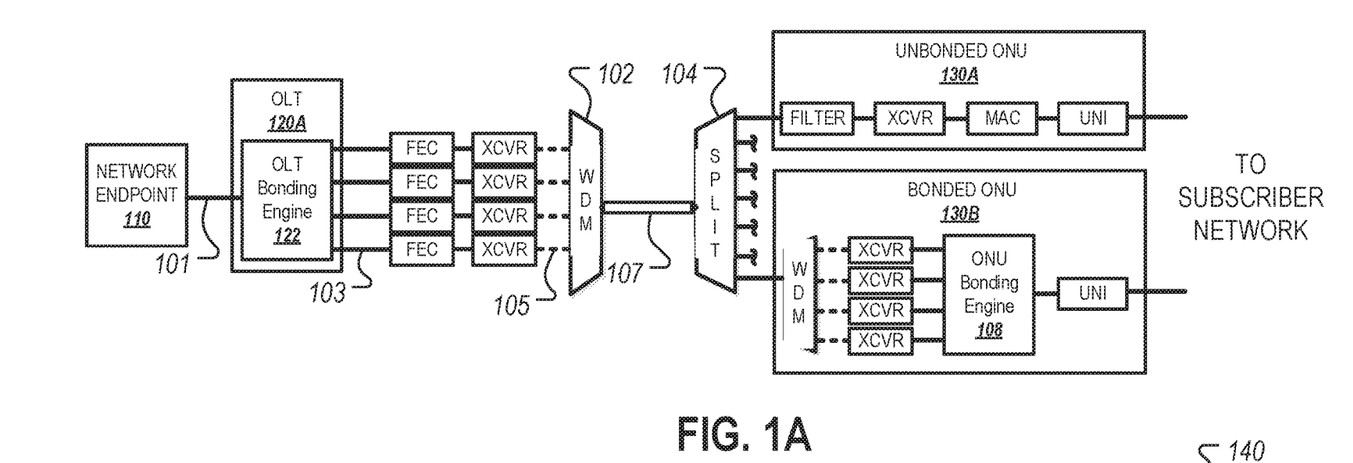
FIG. 1A is a diagram illustrating an example of an optical line terminal (OLT) system for Passive Optical Network (PON) wavelength bonding.
Figure 1B:
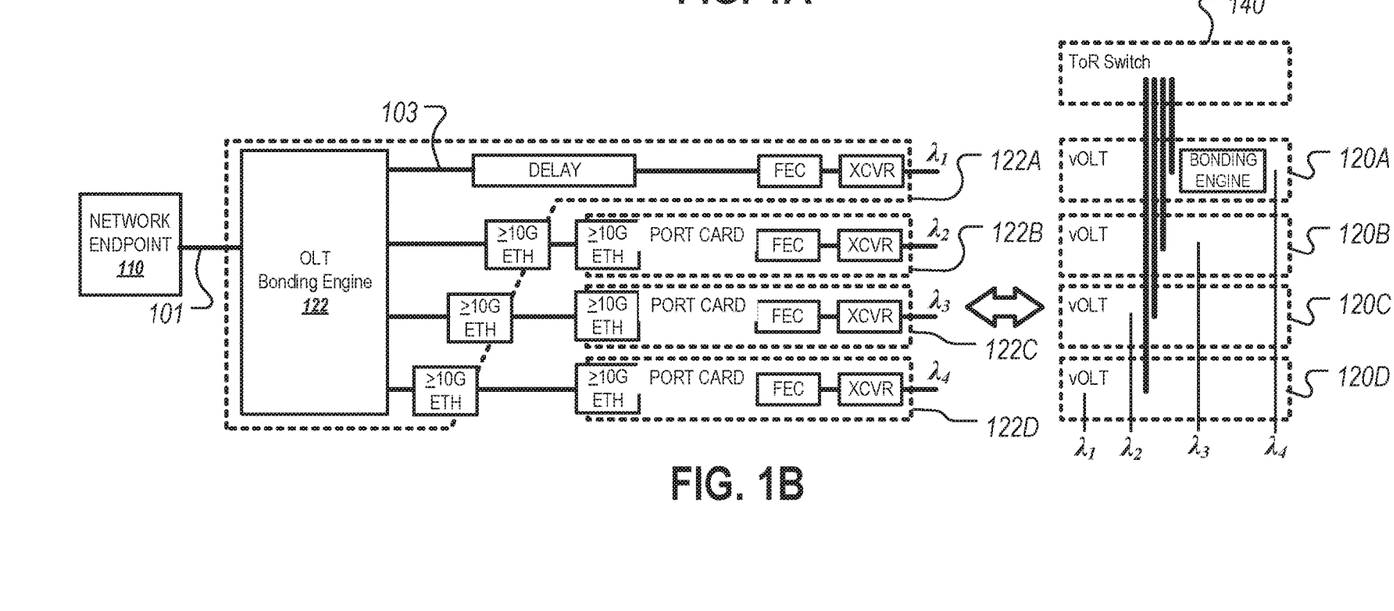
FIG. 1B is a diagram illustrating an example of hosting an OLT bonding engine on an OLT.

FIGS. 1A and 1B are diagrams illustrating an example of an optical line terminal (OLT) system 100 for PON wavelength bonding. As shown in FIG. 1A, the system 100 includes a network endpoint 110, an OLT 120A, an unbonded ONU 130A, and a bonded ONU 130B. The system 100 also includes additional OLTs 120B, 120C, and 120D (shown in FIG. 1B), which, in some implementations, can co-host an OLT bonding engine 122 that is hosted on the OLT 120A. In some implementations, each of the OLTs 120A-D can accommodate several transceivers (not shown), thereby connecting to multiple PONs 107. In the example depicted in FIGS. 1A and 1B, the system 100 is a 4-wavelength NGPON2 OLT system that includes four OLTs 120A, 120B, 120C, and 120D that are configured to serve as port cards 122A, 122B, 122C, and 122D, respectively for the attached PONs (shown in FIG. 1B). The bonding engine 122 for a single PON 107 is hosted on one of the OLTs (e.g., on 120A in FIG. 1B). As more multi-wavelength PONs 107 are enabled in the system 100, the associated bonding engine 122 for each PON 107 is hosted by one of the OLTs 120A-120D, where the overall load is distributed evenly among the available OLTs 120A-120D. Each OLT includes a transceiver that is configured to transmit data on a unique wavelength 105 for the PON. For example, as shown in FIG. 1B, the OLT 120A, which includes port card 122A is configured to transmit packets on wavelength $\lambda_1$, the OLT 120B includes port card 122B is configured to transmit packets on wavelength $\lambda_2$, the OLT 120C includes port card 122C is configured to transmit packets on wavelength $\lambda_3$, and the OLT 120D includes port card 122D is configured to transmit packets on wavelength $\lambda_4$. In this example, the bonding engine 122 for the illustrated PON resides on OLT 120A, but other PONs connected to different CTs on the same OLTs will use bonding engines in OLTs 120B, 120C, or 120D. In some implementations, each OLT is configured to include multiple transceivers that all operate on the same wavelength of light for different PONs. In other implementations, all transceivers associated with the same PON may be located on the same OLT, and the associated bonding engine may be located on that same OLT or on a different OLT.

The network endpoint 110 can be a device that provides a network path to the Internet. As examples, the network endpoint 110 can include peer routers, data center switches, CoRD servers, among others. In some implementations, the network endpoint 110 is an L2/L3 gateway switch or router that provides the OLT 120A with network access to the Internet over an Ethernet attachment 101.

The OLT 120A hosts an OLT bonding engine 122 (including one or more hardware processors) and provides a logical network interface for subscribers over the PON. The OLT bonding engine 122 can perform various management operations related to PON wavelength bonding, as described herein. The OLT bonding engine 122 can also perform PON management operations, such as generating Quality of Service (QoS) reports, and providing per service or per subscriber packet transmission queuing. The bonding engine 122 can also provide a Bonding Service Adaptation Sublayer (SASL) (e.g., XGEM fragmentation and encapsulation) and a Framing Sublayer (FSL) (e.g., adding PON frame header). For example, the bonding engine 122 acts as an L2 Ethernet endpoint for all traffic that traverses the PON (downstream and upstream inclusive). In contrast, the port cards 122B-D are responsible for the PHY adaptation sublayer (PASL) and PHY media dependent interface (PMD).

As shown in FIG. 1A, the system 100 uses a wavelength-division multiplexer (WDM) 102 to multiplex a number of optical carrier signals into a single optical fiber 107 to launch over the PON using the different wavelengths 105. An optical distribution network (ODN) power splitter 104 separates the multiplexed signal carried by the optical fiber 107 to multiple subscriber ONUs, including unbonded and bonded ONUs. For example, the ONU 130A is an unbonded ONU is incapable of bonding across multiple wavelengths and carries data of an unbonded XGEM in a physical port of an OLT. As another example, the ONU 130B is a bonded ONU that is capable of bonding across multiple wavelengths and carries data of one or more bXGEMs in two or physical ports of an OLT. The ONU 130B includes an ONU bonding engine 108 that performs PHY, framing, and SASL. In some implementations, PASL is performed on the bonding engine 122 and only the PMD functions (including burst mode clock-and-data-recovery for upstream) are hosted on the port cards 122A.

The bonding engine 122 can be configured to manage traffic over the PON in both downstream and upstream directions. As shown in FIG. 1B, the downstream direction, for example, from the OLT 120A to the ONU 130B, the bonding engine 122 selects packet data to transmit, performs encapsulation, (e.g., NGPON2 XGEM) to format packets for transmission, inserts physical layer operations and maintenance (PLOAM) overhead and ONU management and control interface (OMCI) overhead, and transmits XGEM and bXGEM data towards the different CT data paths on the port cards 122A-D. The port cards 122A-D add forward error correction (FEC) encoding and potentially other framing overhead and transmit the data out the CT transceiver. As an example, downstream data path between the bonding engine 122 and port card 122A can be a constant bit rate of 8.67 Gb/s for NGPON2 (accounting for FEC insertion at the port card 122A), plus Ethernet overhead for encapsulating the flow (including switching destination and timing information).

In the upstream direction, for example, from the ONU 130A to the OLT 120A, the bonding engine 122 can implement Dynamic Bandwidth Allocation (DBA) routines on each wavelength. The DBA routines on each wavelength can process grants to bonding-capable ONUs such that the same Allocation Identifier (Alloc-ID) (or LLID for 10G-EPON) is identified in the upstream direction to begin transmission on multiple wavelengths. For example, the bonding engine 122 can send bandwidth maps (BWmaps) for each wavelength to the ONU 130B, and the ONU 130B can identify the same Alloc-ID in received BWmaps for multiple wavelengths. Whenever grants for the same Alloc-ID overlap across multiple wavelengths, the ONU 130B can allocate bonded data on the multiple wavelengths similar to the downstream direction, using a single bonded Transmission Container (bT-CONT) per wavelength corresponding to the Alloc-ID. In some implementations, the DBA routines on each wavelength can make the grants occur on different wavelengths at the same time, which leads to higher throughput and, in some cases, leads to lower latency for traffic flows. In some implementations, the DBA routines on each wavelength can assign varying amounts of time per wavelength in order to optimize the DBA scheduling across offered load, which includes balancing bonded load and non-bonded load leading to higher throughput utilization in some cases.

In the example depicted in FIGS. 1A and 1B (e.g., OLT system with 4 OLTs 120A-D), there are 16 channel terminations (i.e., physical transceiver ports) per OLT that each operate its pair of wavelengths on 16 TWDM PONs (i.e., 4 wavelengths per PON). In this example, each bonding engine can sustain roughly 34.67 Gb/s throughput over the PON it operates. Assuming Ethernet encapsulation overhead between the bonding engine 122 and port card results in 10 Gb/s per wavelength, and assuming that the bonding engine 122 is on one of the OLTs (i.e. co-located with exactly one of the ports it attaches to), the network interface capacity of the bonding engine 122 is about 65 Gb/s ingress (downstream packet data plus upstream PON data) and 65 Gb/s egress (upstream packet data plus downstream PON data). For the same PON, the load on the network interface for the port card would be 10 Gb/s ingress for the PON downstream data, and 10 Gb/s egress for the PON upstream data. In order to minimize delay, delay variation, and probability of loss, the traffic between bonding engines and their port cards can be treated as real-time management traffic, which would be higher priority than any other packet flow within the access network.

The architecture depicted in FIGS. 1A and 1B can be configured to avoid a single point of failure over the PON when implementing PON wavelength bonding techniques. For example, in some implementations, 16 bonding engines (e.g., one per PON, 4 wavelengths per bonding engine) can be distributed evenly across the OLTs 120A-D to avoid single points of failure, and to equalize the network interface load between OLTs 120A-D. By placing 4 such bonding engines on each OLT (with 12 port card interfaces for the other 12 CTs on the OLT), the aggregate network interface load would be 380 Gb/s (4×[bonding engine load]+12×[port card load]; 4×65 Gb/s+12×10 Gb). As another example, if the bonding engines for 16 PONs were concentrated on 2 cards, the aggregate load would be 600 Gb/s (8×[bonding engine load]+8×[P.C. load]; (8×65 Gb/s+8×10 Gb). As yet another example, if all bonding engines were located on a single OLT, the aggregate load would be 1,040 Gb/s (16× [bonding engine load]; 16×65 Gb/s).

In a failover scenario of the 4-OLT configuration depicted in FIG. 1B (e.g., hardware or link failure), associated wavelengths will be incapable of rendering bonding traffic when it occurs on a port card. If this occurs on a port card where the bonding engine resides (e.g., the port card 122A), all wavelengths will be impacted, and therefore surviving port cards (e.g., port cards 122B-D) will enable a backup/failover bonding engine on a different OLT to replace the bonding engine 122. If the 4-OLT configuration fails over with 3 surviving port cards, bonding engines on the surviving cards will stop sending data to the failed port card. In some instances, it would also be desirable if the networking equipment connected to the failed OLT also administratively disabled packets coming from the failed card. The 4 failed instances of bonding engines should likewise be distributed so that one of the 3 OLTs hosts 6 bonding engines while the other two host 5. In this scenario, each bonding engine instance is only responsible for sustaining roughly 27 Gb/s of network traffic, plus 2 port cards worth of interconnect, or 47 Gb/s. The OLT with 6 bonding engines would have an aggregate burden of 382 Gb/s (6×47 Gb/s+10×10 Gb/s), and the OLT with 5 bonding engines would have an aggregate burden of 345 Gb/s (5×47 Gb/s+11×10 Gb/s). Note that in cases where the available network capacity is slightly exceeded in the upstream direction, it would be possible for bonding engines to subsequently limit the DBA grants towards the port cards so as to avoid oversubscribing capacity in that direction.

In the failover scenario discussed above, any combination of an approximately even distribution of bonding engines across N different operational OLTs, each bonding engine hosts:
 number of bonding engines per card=ceiling(16/N)
 number of subscribers per bonding engine<N*number-of-ODN-splits
 processing bandwidth per bonding engine<10G*N
 network interface bandwidth per bonding engine<(2N−1)*10G The example above assumes a 10G bidirectional PON data rate, but similar calculations can be extended to other PON rates. The complexity of the bonding engine implementation (in terms of computing joint DBA grants, storing per-subscriber states) can be a product of the number of bonding engines by either the number of subscribers or the processing bandwidth, and the burden is relatively flat per OLT regardless of how many different OLTs (N) are active (since N is in the denominator of the number of bonding engines per card, and in the numerator of the subscriber and processing formulas).

The bonding engine 122 can also be configured to manage and coordinate timing information between the bonding engine 122 and its associated port cards 122A-D. In the upstream direction, a timebase can be synchronized between all OLTs 122A-D that participate in the scheme (as well as with all ONUs). The bonding engine 122 can have a static understanding of its own timebase, where the port cards 122A-D and network interconnect are capable of delivering upstream data to the bonding engine 122 before it digests and processes it. In some implementations, the timebases of the OLTs 122A-D are synchronized with networking timing of the PON for redundancy.

Likewise, in the downstream direction, the port cards 122A-D can have access to data it should be sending in time prior to the expected transmission window. CT ports that are on the same physical card as the bonding engine 122 do not suffer the same network interconnect delay, delay variation, and probability of loss, and therefore the co-located port card 122A may elect to insert an artificial delay buffer in attempt to equalize its path with the other port cards 122B-D. Although the timebase of the bonding engine 122 has these requirements, the bonding engine 122 can be handled with an absolute timebase. For example, a time server can be used to synchronize all OLTs to the same timebase, and the bonding engine 122 can send timestamp information within the headers of the packets it sends towards its port cards to indicate the time at which the packets are to be transmitted on the PON. In the opposite direction, the port cards would timestamp the packets being transmitted towards the bonding engine 122 to indicate the time they were supposed to be received at (and the bonding engine would be responsible for equalizing delay prior to reassembling the bonding data).

Alternatively, in some implementations, a relative timebase can be used to handle timing information between the bonding engine 122 and its associated port cards. For example, the port cards 122C-D could be configured with a relative buffering delay to accommodate the anticipated delay variation, and establish a local timebase on a per-PON basis with the corresponding bonding engine. The relative timebase could be related to the super-frame counter in NGPON2 or to the TQ counter in EPON networks. Likewise in the upstream direction, the port card could transmit the same timebase in the header of encapsulated port traffic back toward the bonding engine 122.

In some implementations, it may not be necessary to embed the bonding engine 122 within the same module as the OLT 120A (with its associated ports). It may also not be necessary to require the use of all 16 CTs on a single OLT. For example, a set of active bonding engines may be placed on a dedicated PON bonding hardware platform dedicated to the task, and purpose-built to stand between the network interfaces on the OLT and the infrastructure-facing network feed. In this example, there would be no additional hairpin traffic (at extremely high priority) to share the network bandwidth of the OLT. Instead, the OLT would act exclusively as a port card, and the bonding engine hardware would be required to support all the downstream buffering and hierarchical quality of service (HQoS) that the OLT may be equipped at present to handle. In a 4-OLT/16-PON scenario, the sum of all network interfaces across all active bonding engines would be approximately 556.8 Gb/s (16× 4×8.7 Gb/s), and the sum of the rates between all bonding engines and port cards would be 640 Gb/s (16*4*10G). The 556.8 Gb/s downstream value may require some level of HQoS in an access network to buffer and schedule subscriber traffic as the interface rates throttle down from the Nx200G aggregate towards max link rates of 34.67 Gb/s (bonded) down to 8.67 Gb/s (unbonded). A reasonable deployment might include two bonding engine cards, each connected via 2×200G to each of the 4 OLTs (i.e. each bonding engine card has 8×200G links connected to various OLTs), along with 6 to 8 200G ports facing the access network edge. Total Ethernet interface capacity on the bonding engine card could sum to 1.4 Tb/s to 1.6 Tb/s.

The descriptions above reference configuration of bonding engines when using TC-layer bonding as the PON bonding technique. In some other implementations, analogous distribution schemes may also be considered for flow-based aggregation techniques for the PON, such as LAG or ECMP. In such implementations, the system 100 could be configured so that each OLT includes a LAG or ECMP distribution processor, where packets taken in to be transmitted on some wavelength on the PON would be transmitted to the flow-based bonding engine instance on one OLT (with associated redundancy on other OLTs as mentioned above in the failover case). In such implementations, the bonding engine 122 can operate as a flow-based bonding engine (or an "aggregation engine"). The port card 122A, in such implementations, would be similarly configured as discussed above except that it would contain the unbonded SASL and FSL. In some instances, the downstream bandwidth of the link between the aggregation engine and the port card 122A can be limited to approximately 8.5-8.7 Gb/s, since the port card may have simpler buffering requirements, though this is not strictly required. Distribution of packets on the aggregation engine could be determined by a LAG/ECMP hashing algorithm, which the OLT 120A would be configured to handle. Since the port card contains the SASL and FSL layers of the TC, there would be no TC-level requirement to coordinate the timebases between the different OLTs, though they are synchronous and may have other requirements that push the need for absolute time synchrony as well.

Figure 2:
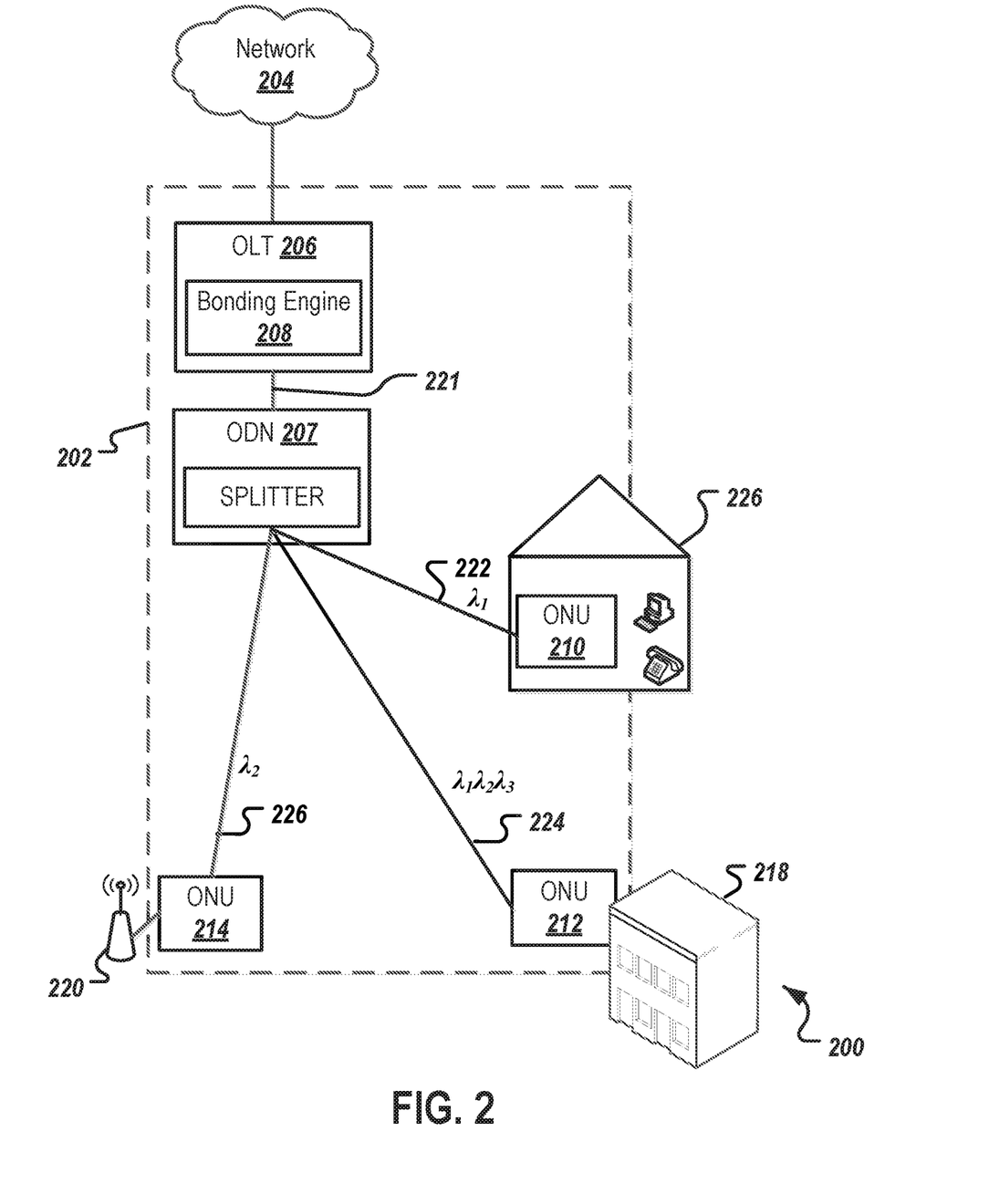
FIG. 2 is a block diagram illustrating an example of a networking environment for Passive Optical Network (PON) wavelength bonding.

FIG. 2 is a block diagram illustrating an example of a networking environment 200 in which wavelengths in a PON can be bonded for providing high-rate low-latency services to individual packet flow. As illustrated in FIG. 1A, the environment 200 includes a PON 202 that connects users to a network 204. In some implementations, the environment 200 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 200.

As illustrated, the PON 202 includes an OLT 206 at a service provider's central office (or other distribution point), an ODN 207, an ONU 210 near residential locations 216, an ONU 212 near business locations 218, and an ONU 214 near wireless communications equipment 220. The OLT 206 is connected to the ONUs 210, 212, and 214 through the ODN 207. The ODN 207 includes a power splitter that separates a multiplexed signal carried by an optical fiber 221 into a fiber optic link 222 connecting the OLT 206 and the ONU 210, a fiber optic link 124 connecting the OLT 206 and the ONU 212, and a fiber optic link 226 connecting the OLT 206 and the ONU 214. The OLT 206 is coupled to a number of ONUs 210, 212, and 214 (also referred to as optical network terminals (ONTs)) through the ODN 207, which are located near end users, thereby forming a point-to-multipoint network. For example, in the case of Next-Generation Passive Optical Network 2 (NG-PON2), a single OLT port can connect to 64 (or another number of) different ONUs. To serve multiple customers on the same network, the NG-PON2 uses logical multiplexing in a downstream direction and time-division multiplexing in an upstream direction, in addition to wavelength multiplexing in both downstream and upstream directions.

Each ONU can include, or otherwise be coupled to, one or more customer-premises equipment (CPE) or subscriber devices (e.g., CPE modems). For example, the ONU 210 is a device that terminates the PON 202 at the customer end, and provides a service connection to a user living in the residential locations 216. The ONU 210 terminates optical fiber transmission, and can transform incoming optical signals into electrical signals, adapted for processing by subscriber devices. As a result, ONUs can provide network services, for example, to residential locations 216, business locations 218, or other forms of communications infrastructure, such as wireless communications equipment 120.

Each ONU can include one or more optical transceivers (e.g., one or more tunable lasers), each of which are sometimes referred to as Access Network Interface (ANI). For example, the ONU 210 includes one optical transceiver or ANI that can receive data from the OLT (or transmit data to the OLT) on a single wavelength $\lambda_1$. The ONU 212 includes multiple ANIs that can receive data from the OLT (or transmit data to the OLT) on three wavelengths $\lambda_1$, $\lambda_2$, and $\lambda_3$. The ONU 214 includes one ANI that can receive data from the OLT (or transmit data to the OLT) on a single wavelength $\lambda_2$. As a result, the ONU 210 (e.g., a non-bonding ONU) can receive non-bonded data from the OLT (or transmit non-bonded data to the OLT) on a single wavelength $\lambda_1$. The ONU 212 (e.g., a bonding-capable ONU) can receive bonded or non-bonded data from the OLT (or transmit bonded or non-bonded data to the OLT) on three wavelengths $\lambda_1$, $\lambda_2$, and $\lambda_3$. The ONU 214 (e.g., a non-bonding ONU) can receive non-bonded data from the OLT (or transmit non-bonded data to the OLT) on a single wavelength $\lambda_2$. The disclosed subject matter does not require all ONUs on a same PON to support multiple wavelengths or bonding. Note that the use of $\lambda_1$ represents one laser wavelength in the downstream direction, and a separate (different, but related) wavelength in the upstream direction.

The OLT 206, as a network distribution element, provides an interface between the PON 202 and the network 204, and serves as the service provider's endpoint of the PON 202. The OLT 206 transmits downstream data traffic to ONUs (e.g., ONUs 210, 212, and 214), and receives upstream data traffic from the ONUs.

As illustrated, the OLT 206 includes a bonding engine 208 through which the OLT controller can detect and identify a bonding-capable ONU on the PON 202. For example, the bonding engine 108 can detect and identify the ONU 212 as a bonding-capable ONU when the ONU 212 registers with the OLT 206. In addition, the bonding engine 108 can ascertain aggregate capabilities in both downstream and upstream directions between the OLT 206 and its attached ONUs through standard discovery mechanisms. For non-bonding ONUs, the OLT 206 will communicate with them according to, for example, an ITU PON standard (e.g., the NG-PON2 standard) or an IEEE PON standard (e.g., the 10G-EPON standard). For a given bonding-capable ONU (e.g., ONU 212), the bonding engine 108 can allocate multiple wavelengths (e.g., $\lambda_1$, $\lambda_2$, and $\lambda_3$) in a bonding group between the ONU and the OLT 206 jointly/simultaneously, for the purpose of bonding data paths between the ONU and the OLT 206 together. Bonding can be achieved independently in the upstream and downstream directions, and can span a variable number of wavelengths between the ONU and the OLT 206.

In the downstream direction, for example, from the OLT 206 to the ONU 212, the bonding engine 108 can determine, in advance, when each wavelength among multiple wavelengths in a bonding group between the OLT 206 to the ONU 212 will be available for transmitting a bonded packet (e.g., by checking transmission schedule on each wavelength). If multiple eligible wavelengths are idle (e.g., configured for bonding but carrying no traffic) when there is a packet to send, the bonding engine 208 can assign various portions of the packet to the multiple wavelengths in the bonding group in a round robin way according to a specified wavelength order known to both the OLT 206 and the ONU 212 (e.g., stored in a memory of the OLT 206 and similarly stored in a memory of the ONU 212). For example, the OLT 206 can inform the ONU 212 of the wavelength order through a management channel, or the order could be established a priori such as according to ascending or descending wavelength. When the ONU 212 receives the various portions of the packet on the multiple wavelengths, the ONU 212 can use a delay equalization technique to align data reception across the synchronous data paths (e.g., ordered wavelengths) and reassemble the packet according to the specified wavelength order.

However, if one or more wavelengths among the multiple wavelengths are busy (e.g., carrying traffic) when there is a packet to send, the bonding engine 208 can determine in advance when each wavelength in the bonding group will be available for transmitting the bonded packet (e.g., by checking a transmission schedule on each wavelength). The bonding engine 208 can predetermine how many bytes of the packet are to be sent on each wavelength, so that transmissions of various portions of the bonded packet on the multiple wavelengths end at the same time or substantially simultaneously. The bonding engine 208 can start sending portions of the bonded packet on one or more idle wavelengths. As the one or more busy wavelengths complete sending its packet, the bonding engine 208 can start sending other portions of the bonded packet on these one or more now-available wavelengths to minimize latency of transmitting the packet. Various portions of the packet can be allocated on the multiple wavelengths in a round robin way according to a specified wavelength order as discussed above. In some cases, when non-bonded traffic is heavy on a particular wavelength, the bonding engine 208 can balance the traffic load by not allocating bonded traffic on the particular wavelength.

In the upstream direction, for example, from the ONU 212 to the OLT 206, the bonding engine 208 can implement Dynamic Bandwidth Allocation (DBA) routines on each wavelength. The DBA routines on each wavelength can process grants to bonding-capable ONUs such that the same Allocation Identifier (Alloc-ID) (or Logical Link layer ID (LLID) for 10G-EPON or 50G-EPON) is identified in the upstream direction to begin transmission on multiple wavelengths. For example, the bonding engine 208 can send bandwidth maps (BWmaps) for each wavelength to the ONU 212, and the ONU 212 can identify the same bonded Alloc-ID in received BWmaps for multiple wavelengths. Whenever grants for the same bonded Alloc-ID overlap across multiple wavelengths, the ONU 212 allocates bonded data on the multiple wavelengths similar to the downstream direction, using a single bonded Transmission Container (bT-CONT) per wavelength corresponding to the Alloc-ID. In some implementations, the DBA routines on each wavelength can make the grants occur on different wavelengths at the same time, which in some cases leads to lower latency for traffic flows. In some implementations, the DBA routines on each wavelength can assign varying amounts of time per wavelength in order to optimize the DBA scheduling across offered load, which includes balancing bonded load and non-bonded load leading to higher throughput utilization in some cases. In some implementations, DBA could use multiple grants on multiple wavelengths per XGTC frame to minimize latency.

In both the downstream and upstream directions, bit streams on the bonded wavelengths can be delay-equalized (e.g., via digital signal buffering), so that a given packet can be distributed on, for example, multiple wavelengths $\lambda_1$, $\lambda_2$, and $\lambda_3$ between the OLT 206 and the ONU 212, and end at similar times on the multiple wavelengths $\lambda_1$, $\lambda_2$, and $\lambda_3$. Due to the point-to-multipoint nature of a PON, delay equalization of multiple wavelengths can be performed at the receiver of the ONU 212 in the downstream direction. In the upstream direction, equalization can be performed at both of or either of the transmitter of the ONU 212 and/or the receiver of the OLT 206. In some implementations, both downstream and upstream transmissions can be synchronized with the reference clock of the OLT 206 in conformance with standard protocols (e.g. NG-PON2 and 10G-EPON). Synchronizing with the reference clock of the OLT 206 can allow the ONU 212 to insert delay in a digital parallel and/or serial data path to achieve delay equalization. For example, in a NG-PON2, delay equalization can result in 64-bit alignment between bonded wavelengths (e.g., the quanta defined for 10-Gigabit-capable Passive Optical Network (XG-PON) Encapsulation Method (XGEM) payload and framing sublayer boundaries). In a 10G-EPON, the alignment can be made in 66-bit blocks defined by the reconciliation sublayer. Other PON variations with higher speeds can achieve delay equalization at wider or narrower data width.

In some implementations, the operations performed by the bonding engine 208 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The bonding engine 208 can also be implemented as special purpose logic circuitry, for example, a field programmable gate array (FPGA) or an application specific integrated circuit (ASIC).

The network 204 facilitates wireless or wireline communications between the components of the PON 202 with any other local or remote computer, such as additional PONs, servers, or other devices communicably coupled to the network 204, including those not illustrated in FIG. 1A. As illustrated in FIG. 1A, the network 204 is depicted as a single network, but may be comprised of more than one network without departing from the scope of this disclosure.

In some situations, one or more of the illustrated components may be implemented, for example, as one or more cloud-based services or operations. The network 204 may be all or a portion of an enterprise or secured network, or at least a portion of the network 204 may represent a connection to the Internet, a public switched telephone network (PSTN), a data server, a video server, or additional or different networks. In some implementations, a portion of the network 204 may be a virtual private network (VPN). Further, all or a portion of the network 204 can comprise either a wireline or wireless link. Examples of wireless links may include 802.11ac/ad/af/a/b/g/n, 802.20, WiMax, LTE, free-space optical links, and/or any other appropriate wireless link. In other words, the network 204 encompasses any internal or external network, networks, sub-network, or combination thereof, operable to facilitate communications between various computing components, inside and outside the environment 200. The network 204 may communicate, for example, Internet Protocol (IP) packets, Frame Relay frames, Asynchronous Transfer Mode (ATM) cells, voice, video, data, and other suitable information between network addresses. The network 204 may also include one or more local area networks (LANs), radio access networks (RANs), metropolitan area networks (MANs), wide area networks (WANs), all or a portion of the Internet, and/or any other communication system or systems at one or more locations.

Figure 3:
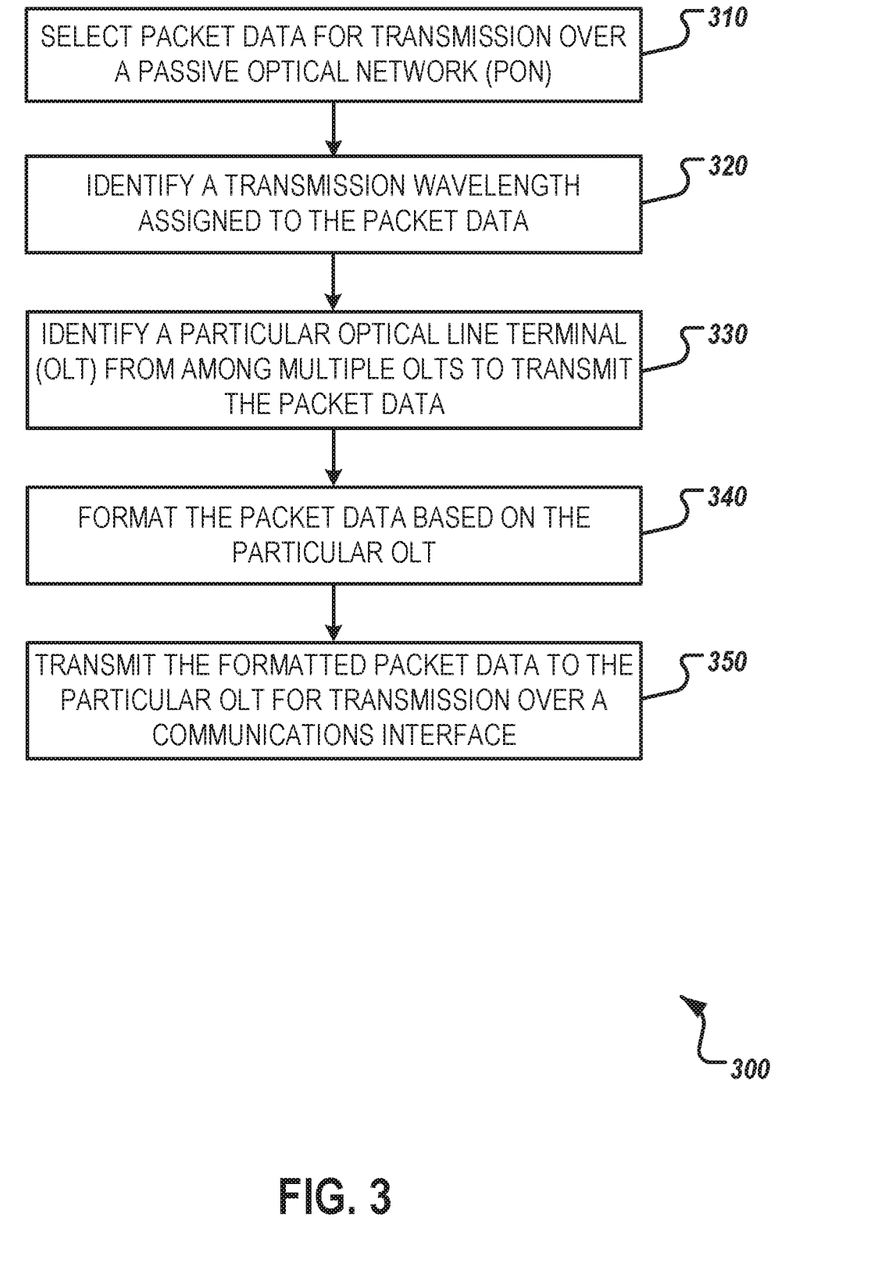
FIG. 3 is a flow chart of an example of a process for encapsulating packet data for transmission over a PON.

FIG. 3 is a flow chart of an example of a process 300 for encapsulating packet data for transmission over a PON. In some implementations, operations of the process 300 are carried out by a bonding engine hosted on a given OLT. The given OLT can be connected to multiple additional OLTs that communicate with ONUs, as illustrated by FIG. 1B. In some implementations, operations of the process 300 can be implemented as instructions that are stored on a computer readable medium. When the instructions are executed by one or more processors, the instructions cause the one or more processors to perform operations of the process 300.

Packet data is selected for transmission over a PON (310). For example, the bonding engine 122 (e.g., hosted by the given OLT) can select packet data for transmission over the PON.

A transmission wavelength is assigned to the packet data (320). For example, in the 4-OLT system depicted in FIGS. 1A and 1B, each of multiple OLTs 122A-D can include a transceiver that is configured to transmit packet over destined for the PON over a different wavelength. The bonding engine 122 can assign a transmission wavelength to the packet data based on the bonding configuration of the XGEM-ID or LLID that dictates which wavelengths the ONU is able to receive the packet over. The bonding engine 122 can additionally consider the congestion level of eligible wavelengths relative to each other to determine which wavelengths to assign for transmission of the packet.

A particular OLT is identified from among multiple OLTs to transmit the packet data (330). For example, in the 4-OLT system depicted in FIGS. 1A and 1B, the bonding engine 122 identifies an OLT from among the OLTs 122A-D to transmit the packet data. As discussed above, the OLT that is identified can be based on the transmission wavelength and depending on the packet data is be transmitted downstream to an unbonded or bonded ONU.

The packet data is formatted based on the particular OLT that acts as port card for the transmission wavelength (340). For example, the bonding engine 122 creates 64-bit segments of data intended for each wavelength, performs encapsulation (e.g., 10G-PON encapsulation for XGEM), and inserts XGEM or LLID overheads to format the packet data.

The formatted packet data is transmitted to the particular OLT for transmission over a communications interface (350). For example, the bonding engine 122 transmits XGEM and bXGEM data toward different CT data paths on the port cards 122B-D. As discussed above, the port cards 122B-D add the forward error correction (FEC) encoding and potentially other framing overhead and transmit the data out the CT transceiver. For another example, the bonding engine 122 transmit XGEM and bXGEM data toward the CT data path on the same OLT card 122A as the bonding engine, but passes the data through a delay buffer to equalize the delay experienced by data passing through to other port cards 122B-D.

In some implementations, the bonding engine 122 is hosted on an OLT system that is coupled to multiple ONUs over a communications interface. The multiple ONUs includes a first ONU 130A that is incapable of bonding across multiple wavelengths and carries data of an unbonded XGEM in a physical port of the OLT 120A that hosts the bonding engine 122. The multiple ONUs also includes a second ONU 130B that is capable of bonding across multiple wavelengths and carries data of one or more bonded XGEMs (bXGEMs) in two or more physical ports of a second OLT of the additional OLTs, such as one of the OLTs 120B-D. In some implementations, the packet data includes a first set of packets to be transmitted to the first ONU 130A and a second set of packets to be transmitted to the second ONU 130B. In some implementations, the bonding engine 122 transmits the first set of packets to a particular OLT, e.g., OLT 120B, for transmission to the first ONU 130A over the communications interface.

In some implementations, formatting the packet data based on the particular OLT includes encapsulating the first set of packets based on the unbonded XGEM in the associated OLT that hosts its wavelength.

In some implementations, the bonding engine 122 is configured to perform additional operations than those depicted in FIG. 3. For example, the bonding engine 122 can select, from among the OLTs 122B-D, a second OLT, e.g., OLT 120C, to transmit the second set of packets over the PON based on the corresponding wavelength of the second OLT matching a transmission wavelength assigned to the second set of packets. The bonding engine 122 can also transmit the second set of packets to the OLT 120C for transmission to the second ONU 130B over the communications interface.

In some implementations, formatting the packet data based on the particular OLT includes encapsulating the second set of packets based on the one or more bXGEMs in two or more physical ports of the OLT 120C.

In some implementations, two or more OLTs from among the OLTs 120A-D can each host a bonding engine. For example, a second OLT 120B can hosts a second bonding engine, and a third OLT 120C hosts a third bonding engine. In such implementations, the second bonding engine and the third bonding engine each terminate a second and third PON, respectively.

In some implementations, the bonding engine 122 operates as a LAG or ECMP distribution processor that is configured to communicate with multiple ONUs through unbonded XGEMs across multiple wavelengths.

In some implementations, the bonding engine 122 is configured to perform additional operations that are not depicted in FIG. 3. For example, the bonding engine 122 can perform operations relating to managing PON wavelength bonding in the upstream direction of the PON. In such implementations, the bonding engine 122 performs joint dynamic bandwidth allocation across a first traffic load for the unbonded XGEM or LLID in a physical port of, for example, the OLT 120B and a second traffic load for the one or more bXGEMs or bonded LLIDs in two or more physical ports of, for example, the OLT 120C. The bonding engine 122 can also generate a first bandwidth map for the first traffic load based on performing the joint dynamic bandwidth allocation across the first traffic load and the second traffic load. Additionally, the bonding engine 122 generates a second bandwidth map for the second traffic load based on performing the joint dynamic bandwidth allocation across the first traffic load and the second traffic load. In this example, the bonding engine 122 transmits the first bandwidth map to the OLT 120B and transmits the second bandwidth map to the OLT 120C.

In some implementations, the OLTs 120A-D include an OLT, for example, the OLT 120D, that is configured to perform forward error correction (FEC) that encodes and decodes data for the physical ports of the OLT 120A. In this example, the OLT 120D can encode downstream data from OLT 120A and transmit the encoded data to the ONUs.

Additionally, the OLT 120D can decode the upstream data from the ONUs and transmit the decoded traffic load to the OLT 120A.

While this specification contains many specific implementation details, these should not be construed as limitations on the scope of any inventions or of what may be claimed, but rather as descriptions of features specific to particular implementations of particular inventions. Certain features that are described in this specification, in the context of separate implementations, can also be implemented in combination or in a single embodiment. Conversely, various features that are described in the context of a single embodiment can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system comprising:
    multiple optical line terminals (OLTs), including:
        a first OLT that hosts a bonding engine;
        additional OLTs that are connected to the first OLT, wherein:
            the additional OLTs include a second OLT that hosts a second bonding engine and terminates a second PON;
            the additional OLTs further include a third OLT that hosts a third bonding engine and terminates a third PON;
            each OLT included in the additional OLTs comprises a transceiver; and
            each transceiver is configured to transmit packets over a passive optical network (PON) on a corresponding wavelength that differs from wavelengths used by other OLTs among the additional OLTs; and
        a communications interface that couples the additional OLTs to multiple optical network units (ONUs), wherein the first OLT includes one or more processors that cause the bonding engine to perform operations including:
            selecting packet data for transmission over the PON;
            identifying a transmission wavelength assigned to the packet data;
            identifying, from among the additional OLTs, a particular OLT to transmit the packet data over the PON based on the corresponding wavelength of the particular OLT matching the identified transmission wavelength assigned to the packet;
            formatting the packet data based on the particular OLT; and
            transmitting the formatted packet data to the particular OLT for transmission over the communications interface.

2. The system of claim 1, wherein the multiple ONUs include:
    a first ONU that is incapable of bonding across multiple wavelengths and carries data of an unbonded XGEM in a physical port of the first OLT; and
    a second ONU that is capable of bonding across multiple wavelengths and carries data of one or more bonded XGEMs (bXGEMs) in two or more physical ports of a second OLT of the additional OLTs.

3. The system of claim 2, wherein the packet data includes a first set of packets to be transmitted to the first ONU and a second set of packets to be transmitted to the second ONU.

4. The system of claim 3, wherein:
    formatting the packet data includes formatting the first set of packets; and
    transmitting the formatted packet data to the particular OLT for transmission over the communications interface includes transmitting the first set of formatted packets to the particular OLT for transmission to the first ONU over the communications interface.

5. The system of claim 4, wherein formatting the first set of packets based on the particular OLT includes encapsulating the first set of packets based on the unbonded XGEM in two or more physical ports of the particular OLT.

6. The system of claim 3, wherein:
    the one or more processors cause the bonding engine to perform operations that further include identifying, from among the additional OLTs, the second OLT to transmit the second set of packets over the PON based on the corresponding wavelength of the second OLT matching a transmission wavelength assigned to the second set of packets;
    formatting the packet data includes formatting the second set of packets based on the particular OLT; and
    transmitting the formatted packet data to the particular OLT for transmission over the communications interface includes transmitting the second set of formatted packets to the second OLT for transmission to the second ONU over the communications interface.

7. The system of claim 6, wherein formatting the second set of packets based on the particular OLT includes encapsulating the second set of packets based on the one or more bXGEMs in two or more physical ports of the second OLT.

8. The system of claim 1, wherein the bonding engine operates as a link aggregation group (LAG) distribution processor that is configured to communicate with the multiple ONUs through unbonded XGEMs across multiple wavelengths.

9. The system of claim 2, wherein the one or more processors cause the bonding engine to perform operations that further include:
    performing joint dynamic bandwidth allocation across a first traffic load for the unbonded XGEM or LLID in a physical port of the particular OLT and a second traffic load for the one or more bXGEMs or bonded LLIDs in two or more physical ports of the second OLT;
    generating a first bandwidth map for the first traffic load based on performing the joint dynamic bandwidth allocation across the first traffic load and the second traffic load; and
    generating a second bandwidth map for the second traffic load based on performing the joint dynamic bandwidth allocation across the first traffic load and the second traffic load;
    transmitting the first bandwidth map to the particular OLT; and
    transmitting the second bandwidth map to the second OLT.

10. The system of claim 2, wherein the additional OLTs include a second OLT that is configured to perform forward error correction (FEC) that encodes and decodes data for the physical port of the first OLT.

11. The system of claim 10, wherein the second OLT is configured to perform operations that include:
encoding downstream data from the first OLT; and
transmitting the encoded downstream data to the multiple ONUs.

12. The system of claim 10, wherein the second OLT is configured to perform operations that include:
decoding upstream data from the multiple ONUs; and
transmitting the decoded traffic load to the first OLT.

13. The system of claim 1, wherein the one or more processors cause the bonding engine to perform operations that further include:
identifying a timebase of the first OLT;
identifying a respective timebase of each of the additional OLTs; and
synchronizing the timebases of the additional OLTs based on the timebase of the first OLT.

14. The system of claim 1, wherein formatting the packet data includes:
identifying timestamp information for packets to be transmitted over the PON; and
inserting, for each of the packets to be transmitted over the PON, corresponding timestamp information in a header of the packet.

15. The system of claim 1, wherein the first OLT and one or more of the additional OLTs are configured to perform TC-layer bonding for packets to be transmitted over the PON.

16. The system of claim 1, wherein:
the additional OLTs includes a subset of additional OLTs that each host a failover bonding engine; and
an OLT included in the subset of additional OLTs includes one or more processors that cause the failover bonding engine to perform operations including:
determining that the bonding engine hosted on the first OLT is not operational; and
based on determining that the bonding engine hosted on the first OLT is not operational, distributing the operations to be performed by the bonding engine hosted on the first OLT to the failover bonding engines hosted on the OLTs included in the subset of additional OLTs.

17. A method performed by an optical line terminal (OLT) bonding engine hosted on a given OLT, the method comprising:
selecting packet data for transmission over the PON;
identifying a transmission wavelength assigned to the packet data;
identifying, from among additional OLTs, a particular OLT to transmit the packet data over the PON based on the corresponding wavelength of the particular OLT matching the identified transmission wavelength assigned to the packet formatting the packet data based on the particular OLT;
transmitting the formatted packet data to the particular OLT for transmission over a communications interface, wherein a bonding engine of the given OLT operates as a link aggregation group (LAG) distribution processor that is configured to communicate with multiple ONUs through unbonded XGEMs across multiple wavelengths.

18. A non-transitory computer-readable storage device encoded with computer program instructions that, when executed by an optical line terminal (OLT) controller, cause the OLT controller to perform operations comprising:
selecting packet data for transmission over the PON;
identifying a transmission wavelength assigned to the packet data;
identifying, from among the additional OLTs, a particular OLT to transmit the packet data over the PON based on the corresponding wavelength of the particular OLT matching the identified transmission wavelength assigned to the packet;
formatting the packet data based on the particular OLT; and
transmitting the formatted packet data to the particular OLT for transmission over a communications interface, wherein a bonding engine of the OLT operates as a link aggregation group (LAG) distribution processor that is configured to communicate with multiple ONUs through unbonded XGEMs across multiple wavelengths.

* * * * *